United States Patent
Elzein

(10) Patent No.: US 9,361,090 B2
(45) Date of Patent: Jun. 7, 2016

(54) APPARATUS AND METHOD OF SOFTWARE IMPLEMENTATION BETWEEN A VEHICLE AND MOBILE DEVICE

(71) Applicant: Ford Global Technologies, LLC, Dearborn, MI (US)

(72) Inventor: Hadi Elzein, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 59 days.

(21) Appl. No.: 14/162,861

(22) Filed: Jan. 24, 2014

(65) Prior Publication Data

US 2015/0212807 A1    Jul. 30, 2015

(51) Int. Cl.
| G06F 9/445 | (2006.01) |
| H04L 29/08 | (2006.01) |
| H04W 4/00 | (2009.01) |

(52) U.S. Cl.
CPC *G06F 8/65* (2013.01); *H04L 67/10* (2013.01); *H04L 67/12* (2013.01); *H04W 4/001* (2013.01); *H04W 4/008* (2013.01)

(58) Field of Classification Search
None
See application file for complete search history.

(56) References Cited

U.S. PATENT DOCUMENTS

| | | | |
|---|---|---|---|
| 6,028,537 A | 2/2000 | Suman et al. | |
| 6,278,772 B1 | 8/2001 | Bowater et al. | |
| 6,385,535 B2 | 5/2002 | Chishi et al. | |
| 6,411,899 B2 | 6/2002 | Dussell | |
| 6,430,488 B1 | 8/2002 | Goldman et al. | |
| 6,459,969 B1 | 10/2002 | Bates et al. | |
| 6,505,780 B1 | 1/2003 | Yassin et al. | |
| 6,600,975 B2 | 7/2003 | Moriguchi et al. | |
| 6,629,033 B2 | 9/2003 | Preston et al. | |
| 6,728,349 B2 | 4/2004 | Chang et al. | |
| 6,845,251 B2 | 1/2005 | Everhart et al. | |
| 6,928,428 B1 | 8/2005 | De Vries | |
| 6,993,490 B2 | 1/2006 | Chen et al. | |
| 7,065,533 B2 | 6/2006 | Arrouye et al. | |

(Continued)

FOREIGN PATENT DOCUMENTS

| EP | 1969458 | 9/2008 |
| JP | 2007205872 | 8/2007 |

(Continued)

OTHER PUBLICATIONS

"Software stack" Definition from PC Magazine Encyclopedia, Jul. 19, 2013.*

(Continued)

*Primary Examiner* — Daxin Wu
(74) *Attorney, Agent, or Firm* — Jennifer M. Stec; Brooks Kushman P.C.

(57) ABSTRACT

A vehicle computer system (VCS) configured to communicate with a mobile device, comprising a wireless transceiver configured to communicate with the mobile device. The VCS also includes a VCS software stack configured to interact with a mobile device software stack and a processor configured to receive a message from the mobile device indicating a version of the mobile device software stack. The processor is also configured to determine if the VCS needs an update to the VCS software stack based at least upon the version of the mobile device software stack, download an update to the VCS software stack from an off-board server, update the VCS to include the updated VCS software stack, and communicate with the mobile device utilizing the updated VCS software stack.

16 Claims, 2 Drawing Sheets

(56) References Cited

U.S. PATENT DOCUMENTS

| | | |
|---|---|---|
| 7,120,928 B2 | 10/2006 | Sheth et al. |
| 7,129,825 B2 | 10/2006 | Weber |
| 7,139,722 B2 | 11/2006 | Perrella et al. |
| 7,142,664 B2 | 11/2006 | Seligmann |
| 7,145,998 B1 | 12/2006 | Holder et al. |
| 7,162,237 B1 | 1/2007 | Silver et al. |
| 7,283,813 B2 | 10/2007 | Hamanaga et al. |
| 7,340,691 B2 | 3/2008 | Bassett et al. |
| 7,346,630 B2 | 3/2008 | Eichstaedt |
| 7,376,226 B2 | 5/2008 | Holder et al. |
| 7,433,714 B2 | 10/2008 | Howard et al. |
| 7,444,384 B2 | 10/2008 | Horvitz |
| 7,469,827 B2 | 12/2008 | Katragadda et al. |
| 7,474,264 B2 | 1/2009 | Bolduc et al. |
| 7,516,201 B2 | 4/2009 | Kovacs et al. |
| 7,552,009 B2 | 6/2009 | Nelson |
| 7,574,195 B2 | 8/2009 | Krasner et al. |
| 7,586,956 B1 | 9/2009 | Mishra et al. |
| 7,725,480 B2 | 5/2010 | Bassett et al. |
| 7,747,246 B2 | 6/2010 | Zellner et al. |
| 7,801,283 B2 | 9/2010 | Harwood et al. |
| 7,813,950 B2 | 10/2010 | Perrella et al. |
| 7,889,096 B2 | 2/2011 | Breed |
| 7,985,911 B2 | 7/2011 | Oppenheimer |
| 8,112,720 B2 | 2/2012 | Curtis |
| 8,126,889 B2 | 2/2012 | Pitt |
| 8,223,975 B2 | 7/2012 | Marko |
| 8,233,890 B2 | 7/2012 | Zellner et al. |
| 2001/0037174 A1 | 11/2001 | Dickerson |
| 2002/0068583 A1 | 6/2002 | Murray |
| 2002/0107032 A1 | 8/2002 | Agness et al. |
| 2002/0120725 A1* | 8/2002 | DaCosta et al. ............ 709/221 |
| 2002/0143879 A1 | 10/2002 | Sommerer |
| 2002/0196280 A1 | 12/2002 | Bassett et al. |
| 2003/0061079 A1* | 3/2003 | Noghero ............... G01C 21/26 705/5 |
| 2003/0131023 A1 | 7/2003 | Bassett et al. |
| 2003/0212480 A1 | 11/2003 | Lutter et al. |
| 2004/0073643 A1 | 4/2004 | Hayes et al. |
| 2004/0090121 A1 | 5/2004 | Simonds et al. |
| 2004/0092253 A1 | 5/2004 | Simonds et al. |
| 2004/0093154 A1 | 5/2004 | Simonds et al. |
| 2004/0093155 A1 | 5/2004 | Simonds et al. |
| 2004/0192270 A1 | 9/2004 | Kreitzer |
| 2004/0220768 A1 | 11/2004 | Klein |
| 2004/0254715 A1 | 12/2004 | Yamada |
| 2004/0268270 A1 | 12/2004 | Hill et al. |
| 2005/0019228 A1 | 1/2005 | Myers et al. |
| 2005/0088284 A1 | 4/2005 | Zai et al. |
| 2005/0119030 A1 | 6/2005 | Bauchot et al. |
| 2005/0149520 A1 | 7/2005 | de Vries |
| 2005/0222933 A1 | 10/2005 | Wesby |
| 2006/0058948 A1 | 3/2006 | Blass et al. |
| 2006/0071804 A1 | 4/2006 | Yoshioka |
| 2006/0106912 A1* | 5/2006 | Kim et al. ............ 709/203 |
| 2006/0165015 A1 | 7/2006 | Melick et al. |
| 2006/0168627 A1 | 7/2006 | Zeinstra et al. |
| 2006/0258377 A1 | 11/2006 | Economos et al. |
| 2006/0290490 A1 | 12/2006 | Kraus et al. |
| 2007/0004387 A1 | 1/2007 | Gadamsetty et al. |
| 2007/0016362 A1 | 1/2007 | Nelson |
| 2007/0042812 A1 | 2/2007 | Basir |
| 2007/0044037 A1 | 2/2007 | Amari et al. |
| 2007/0053513 A1 | 3/2007 | Hoffberg |
| 2007/0061067 A1 | 3/2007 | Zeinstra et al. |
| 2007/0099568 A1* | 5/2007 | Yang et al. ............ 455/41.2 |
| 2007/0120948 A1 | 5/2007 | Fujioka et al. |
| 2007/0140187 A1 | 6/2007 | Rokusek et al. |
| 2007/0233725 A1 | 10/2007 | Michmerhuizen et al. |
| 2007/0238491 A1 | 10/2007 | He |
| 2007/0264990 A1 | 11/2007 | Droste et al. |
| 2007/0281603 A1 | 12/2007 | Nath et al. |
| 2007/0285256 A1 | 12/2007 | Batra |
| 2007/0294304 A1 | 12/2007 | Bassett et al. |
| 2007/0299882 A1 | 12/2007 | Padgett et al. |
| 2008/0005680 A1 | 1/2008 | Greenlee |
| 2008/0007120 A1* | 1/2008 | Weyl ............ G06F 8/60 307/10.1 |
| 2008/0010014 A1* | 1/2008 | Hess et al. ............ 701/211 |
| 2008/0046880 A1* | 2/2008 | Jun et al. ............ 717/173 |
| 2008/0057927 A1 | 3/2008 | Han |
| 2008/0065816 A1* | 3/2008 | Seo ............ 711/103 |
| 2008/0086455 A1 | 4/2008 | Meisels et al. |
| 2008/0140488 A1 | 6/2008 | Oral et al. |
| 2008/0143497 A1 | 6/2008 | Wasson et al. |
| 2008/0159503 A1 | 7/2008 | Helbling et al. |
| 2008/0263069 A1 | 10/2008 | Harris et al. |
| 2008/0281518 A1 | 11/2008 | Dozier et al. |
| 2008/0294483 A1 | 11/2008 | Williams |
| 2008/0294663 A1 | 11/2008 | Heinley et al. |
| 2008/0319653 A1 | 12/2008 | Moshfeghi |
| 2008/0319665 A1 | 12/2008 | Berkobin et al. |
| 2009/0002145 A1 | 1/2009 | Berry et al. |
| 2009/0005966 A1 | 1/2009 | McGray et al. |
| 2009/0011799 A1 | 1/2009 | Douthitt et al. |
| 2009/0056525 A1 | 3/2009 | Oppenheimer |
| 2009/0074168 A1 | 3/2009 | Henry |
| 2009/0075624 A1 | 3/2009 | Cox et al. |
| 2009/0094088 A1 | 4/2009 | Chen et al. |
| 2009/0111422 A1 | 4/2009 | Bremer et al. |
| 2009/0112608 A1 | 4/2009 | Abu-Hakima et al. |
| 2009/0144622 A1 | 6/2009 | Evans et al. |
| 2009/0157717 A1 | 6/2009 | Palahnuk et al. |
| 2009/0193149 A1 | 7/2009 | Khosravy |
| 2009/0248285 A1 | 10/2009 | Baur |
| 2009/0267757 A1 | 10/2009 | Nguyen |
| 2009/0300595 A1* | 12/2009 | Moran et al. ............ 717/170 |
| 2009/0312901 A1 | 12/2009 | Miller et al. |
| 2010/0017543 A1 | 1/2010 | Preston et al. |
| 2010/0062714 A1 | 3/2010 | Ozaki |
| 2010/0086112 A1 | 4/2010 | Jiang et al. |
| 2010/0088367 A1* | 4/2010 | Brown et al. ............ 709/203 |
| 2010/0125801 A1 | 5/2010 | Shin |
| 2010/0136944 A1 | 6/2010 | Taylor et al. |
| 2010/0148920 A1 | 6/2010 | Philmon et al. |
| 2010/0159964 A1 | 6/2010 | Ferro |
| 2010/0169432 A1 | 7/2010 | Santori, Jr. et al. |
| 2010/0210302 A1 | 8/2010 | Santori et al. |
| 2010/0227629 A1 | 9/2010 | Cook et al. |
| 2010/0228803 A1 | 9/2010 | Quinn |
| 2010/0233957 A1 | 9/2010 | Dobosz |
| 2010/0235825 A1* | 9/2010 | Azulay et al. ............ 717/172 |
| 2010/0235891 A1 | 9/2010 | Oglesbee et al. |
| 2010/0274689 A1 | 10/2010 | Hammad et al. |
| 2010/0274865 A1 | 10/2010 | Frazier et al. |
| 2010/0287024 A1 | 11/2010 | Ward et al. |
| 2010/0323657 A1 | 12/2010 | Barnard et al. |
| 2010/0330975 A1 | 12/2010 | Basir |
| 2011/0021234 A1 | 1/2011 | Tibbits |
| 2011/0039581 A1 | 2/2011 | Cai et al. |
| 2011/0040707 A1 | 2/2011 | Theisen et al. |
| 2011/0045810 A1 | 2/2011 | Issa et al. |
| 2011/0072492 A1 | 3/2011 | Mohler et al. |
| 2011/0087705 A1 | 4/2011 | Swink et al. |
| 2011/0121991 A1 | 5/2011 | Basir |
| 2011/0137520 A1 | 6/2011 | Rector et al. |
| 2011/0137773 A1 | 6/2011 | Davis, III et al. |
| 2011/0144980 A1 | 6/2011 | Rysenga |
| 2011/0176670 A1 | 7/2011 | Kaplan et al. |
| 2011/0225259 A1* | 9/2011 | Quinn et al. ............ 709/217 |
| 2011/0257881 A1 | 10/2011 | Chen et al. |
| 2011/0289522 A1 | 11/2011 | Pontual et al. |
| 2011/0298924 A1 | 12/2011 | Miller et al. |
| 2011/0300843 A1 | 12/2011 | Miller et al. |
| 2011/0300884 A1 | 12/2011 | Ollila et al. |
| 2012/0010805 A1 | 1/2012 | Wilkerson |
| 2012/0041633 A1 | 2/2012 | Schunder et al. |
| 2012/0050028 A1 | 3/2012 | Mastronardi et al. |
| 2012/0130953 A1 | 5/2012 | Hind et al. |
| 2012/0149441 A1 | 6/2012 | Saito et al. |
| 2012/0158658 A1 | 6/2012 | Wilkerson |
| 2012/0158918 A1 | 6/2012 | Leblanc et al. |
| 2012/0167071 A1* | 6/2012 | Paek ............ G06F 8/65 717/170 |

(56) References Cited

U.S. PATENT DOCUMENTS

| | | | |
|---|---|---|---|
| 2012/0172009 A1 | 7/2012 | Wilkerson | |
| 2012/0225677 A1 | 9/2012 | Forstall et al. | |
| 2012/0233365 A1* | 9/2012 | Baek | 710/72 |
| 2012/0303476 A1* | 11/2012 | Krzyzanowski | G06F 8/60 705/26.5 |
| 2015/0178067 A1* | 6/2015 | Ji | G01C 21/36 717/170 |
| 2015/0227359 A1* | 8/2015 | Todoroki | G06F 8/65 717/169 |

FOREIGN PATENT DOCUMENTS

| | | |
|---|---|---|
| JP | 2008172820 | 7/2008 |
| WO | 03107129 | 12/2003 |
| WO | 2011016886 | 2/2011 |
| WO | 2013/039763 | 3/2013 |

OTHER PUBLICATIONS

Search Report for German Applications 102011089349.0 (FMC 3324 PUS corresponding DE application) dated Jan. 8, 2013, 7 pages.

Zancho, W. (Dec. 20, 2005). "Preference handling method e.g. for audio attributes, involves arbitrating preferences of several users based on arbitrating preferences of several users based on arbitration scheme of controller and controlling operatin of domain system based on arbitration of preferences."

Blackberry, Blackberry Curve Series Blackberry Curve 9300/9330 Smartphones, User Guide Version 6.0, www.blackberry.com/docs/smartphones.

AppManiax,Inc. "PhonePlus Callback," http://www.handango.com/catalog/ProductDetails.jsp?productId=254405&platformId=80.

JnetX Call Reminder for Blackberry. Feb. 17, 2009. Retrieved from http://www.pocketberry.com/2009/02/17/jnetx-call-reminder-for-blackberry/.

Christoph Hammerschmidt, MELEXIS, The Sky's the Limit, Continental NXP to integrate NFC into cars, Feb. 17, 2011, http://automotive-eetimes.com/en/continental-nxp-to-integrate-nfc-into-cars.html?cmp_id=.

Ford Motor Company, "SYNC with Navigation System," Owner's Guide Supplement, SYNC System Version 1 (Jul. 2007).

Ford Motor Company, "SYNC," Owner's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 1-3.

* cited by examiner

APPARATUS AND METHOD OF SOFTWARE IMPLEMENTATION BETWEEN A VEHICLE AND MOBILE DEVICE

TECHNICAL FIELD

The illustrative embodiments generally relate to an apparatus and method for software implementation between a vehicle and a mobile device.

BACKGROUND

U.S. Pat. No. 7,516,201 discloses a communication device and a software for operating multimedia applications in one or more communication networks, with a computing manager unit for managing and providing multimedia applications on the basis of a communication with one or more communication devices in the one or more communication networks, whereby the computing manager unit controls a device discovery manager unit for detecting the availability of one or more devices and/or one or more communication networks, a service discovery manager unit for providing available services from and/or for said one or more communication networks, and a virtual device manager unit providing a graphical user interface for controlling devices and/or services of the one or more communication networks.

WO 2013/039763 discloses systems, software and methods for using a mobile phone in conjunction with a head unit of a vehicle. The user interface of a user application program executing on the mobile phone is extended to utilize a generic display screen of the head unit, so that custom or per application development of head unit software can be avoided. Preferably, a handset application proxy (HAP) software application is installed and executable in the mobile phone; and a head unit proxy (HUP) software component is executable on the head unit. The HAP and the HUP communicate messages between the head unit and the mobile phone. Preferably, the HAP includes a scripting language component associated with the user application, and having a template message translator component.

SUMMARY

A first illustrative embodiment includes a vehicle computer system (VCS) configured to communicate with a mobile device, comprising a wireless transceiver configured to communicate with the mobile device. The VCS also includes a VCS software stack configured to interact with a mobile device software stack and a processor configured to receive a message from the mobile device indicating a version of the mobile device software stack. The processor is also configured to determine if the VCS needs an update to the VCS software stack based at least upon the version of the mobile device software stack, download an update to the VCS software stack from an off-board server, update the VCS to include the updated VCS software stack, and communicate with the mobile device utilizing the updated VCS software stack.

A second illustrative embodiment includes a vehicle computer system (VCS) configured to communicate with one or more mobile devices, comprising a wireless transceiver configured to communicate with a mobile device. The VCS also includes a VCS Bluetooth profile configured to interact with a mobile device Bluetooth profile and a processor configured to receive a message from the mobile device indicating a version of the Bluetooth profile. The processor is further configured to determine if the VCS needs an update to the VCS Bluetooth profile based at least upon the version of the mobile device Bluetooth profile, determine if sufficient memory space is available to download and install the update to the VCS Bluetooth profile, download a software update to the VCS Bluetooth profile from an off-board server, the software update including additional features specific to the mobile device, update the VCS to include the software update, and communicate with the mobile device utilizing the updated VCS Bluetooth profile.

A third illustrative embodiment includes a method of a vehicle computer system (VCS) communicating with a mobile device (MD), comprising receiving a message from the MD indicating a version of the MD software stack, determining if the VCS software stack needs an update based at least upon the version of the MD software stack, downloading and installing an update to the VCS software stack from an off-board server, and communicating with the MD utilizing the updated VCS software stack.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
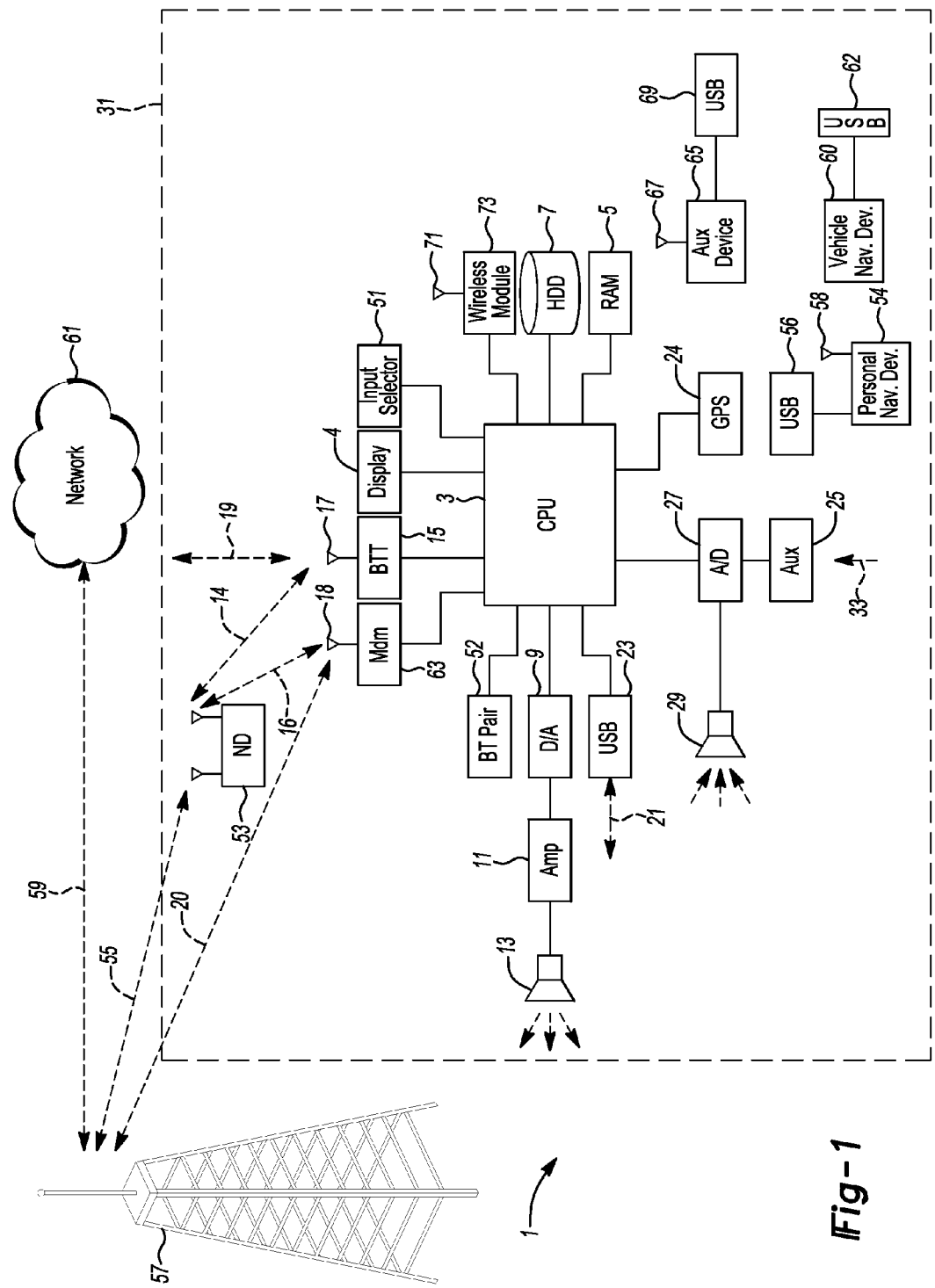
FIG. 1 illustrates an example block topology for a vehicle based computing system (VCS) for a vehicle.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11 g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
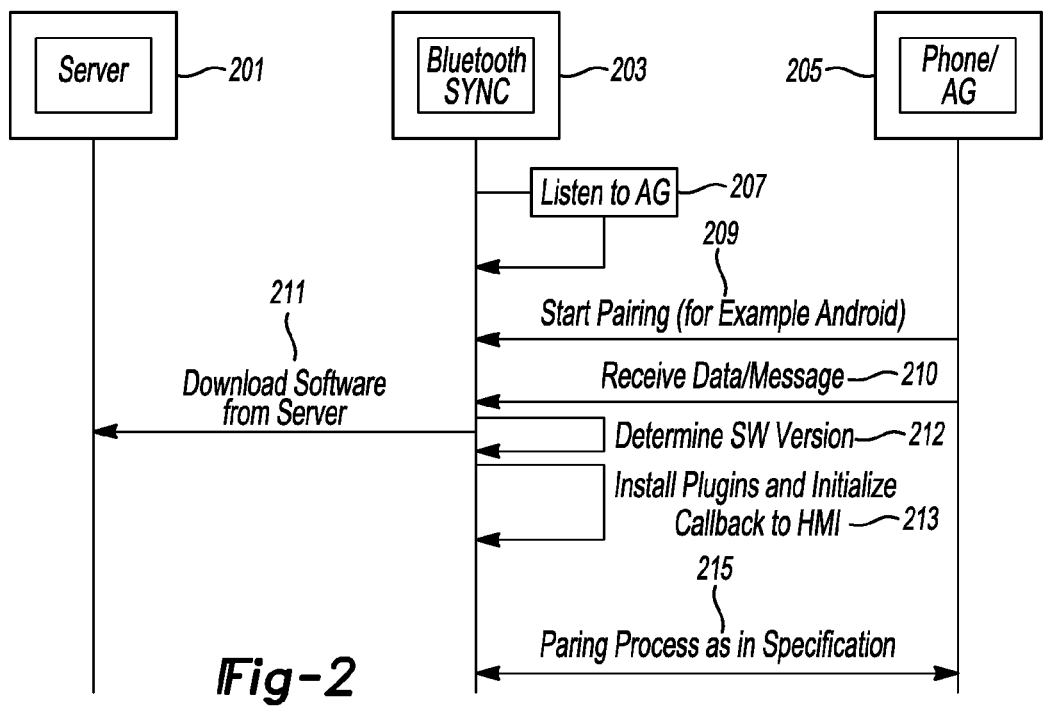
FIG. 2 illustrates an example flow chart of the vehicle based computing system, server, and mobile device interacting with one another during a software update.

FIG. 2 illustrates an example flow chart of the vehicle based computing system, server, and mobile device interacting with one another. Although this figure illustrates the vehicle or vehicle computer system VCS 203 communicating with the server 201, the mobile phone or audio gateway 205 may also communicate with the server 201. The vehicle 203 may be equipped with a VCS that includes a wired or wireless transceiver to communicate with the mobile phone 205.

The VCS 203 may be listening for an audio gateway device or mobile phone 207 to begin the pairing process. In other embodiments, the VCS may also seek discovery of a mobile phone that is listening to hear from devices. Upon receiving a pairing request from a device, the VCS and mobile phone may begin the pairing process 209. The pairing process may be unique for each specific operating system of the mobile phone 209. For example, Android, iOS, RIM, and Windows may each have a unique pairing process to communicate with devices. Thus, a software update on the VCS or mobile phone may increase interoperability between the two devices. Additionally, the VCS may require a software update to increase interoperability between the devices.

During the pairing process, the mobile phone may request the VCS to indicate the software version of a software stack that is running on the VCS. The mobile device may send a message to the VCS to indicate that the software running on the VCS (e.g. the Bluetooth software stack) is old. The software stack may refer to software that is an implementation of the Bluetooth protocol stack. The stack may be used for general-purpose implementations for emphasis on feature-richness and flexibility or embedded system implementations intend for use in devices where resources are limited and demands are lower, such as Bluetooth peripheral devices. The Bluetooth software stack may facilitate communication between the HMI layer and the specific Bluetooth profiles (e.g. HFP, A2DP, PBAP, etc.). The software stack may be located at the Host Controller Interface (HCI) layer for Bluetooth implementation.

The VCS or mobile phone may be able to determine whether the software version is up to date for the software stack 212. For example, the mobile phone may tell the version of the Android respondent stack which may work the best with the VCS. In alternative, the mobile device or audio gateway device may send data or information representing the version of software that the mobile device runs 210. Additionally, the mobile device may send a message indicating other information related to the software running on the mobile device 210. For example, the message may include the version number, operating system, phone manufacturer, Bluetooth profile version information, etc.

Upon determining that the VCS needs new software, the VCS may indicate to the mobile phone to download new software 211 or the VCS may download the software utilizing an embedded cellular transceiver to communicate with the server 201. The VCS may download the update or new software stack onto the VCS or onto the mobile phone. In some scenarios, the VCS may not have the required memory or space to download the stack. The VCS may check to determine if sufficient memory is present. The VCS may receive data from the mobile phone or off-board server indicating how much memory is required for the download and installation.

If insufficient memory is present the system may notify the user with an audio or visual warning utilizing the VCS to indicate that memory needs to be present in order for the update to occur. Additionally, the VCS may also request that the user utilize additional flash drives, external storage device, or mobile phone to be utilized to save the update.

If the VCS or mobile phone detects an error occurring during the download cycle, the VCS may output an error message on the display to notify the user of the error. The system may automatically try to download the update stack again. Additionally, if the error occurs on multiple occasions, the VCS may attempt to install a different software stack update than originally anticipated. For example, the VCS may run version 1.0 of the software stack or profile. The mobile device may request an update to version 3.0 for the VCS. If the VCS is unable to download version 3.0, the VCS may update an intermediary version, such as 2.9 or 2.8 instead.

Upon downloading the update, the system may execute an executable file or run an application to update the software stack. Additionally, the system may install various plugins when running the software update. The software update may initialize a callback to the HMI that is optimized to operate with the mobile phone. The mobile device may also start streaming an executable at the Bluetooth chipset level if the phone downloads the update. The system may then begin to pair the mobile device with the VCS according to the process in the specification.

An additional embodiment may include similar configuration, however, it may determine that an update or additional Bluetooth profile needs to be downloaded and installed to the VCS and/or the mobile device. Thus, the VCS may determine that a new version of the Bluetooth profile must be downloaded to the mobile device or VCS. Thus, the VCS may implement a configuration similar to the previous embodiments as directed to update the Bluetooth profiles of the VCS or mobile device. The embodiments may include a version that updates the software stack, Bluetooth profile, or both the software stack and Bluetooth profile.

Figure 3:
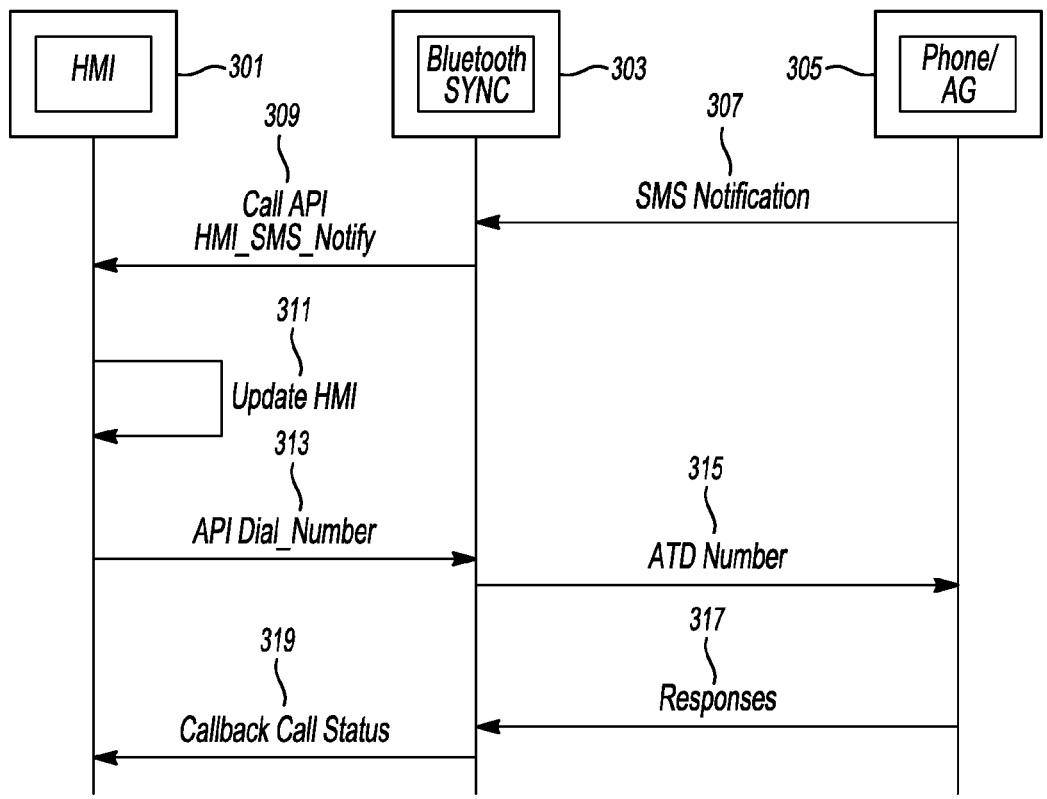
FIG. 3 illustrates an example flow chart of the vehicle based computing system, server, and mobile device interacting with one another.

FIG. 3 is an example of the flow chart of the vehicle based computing system, server, and mobile device interacting with one another. The VCS may include a human machine interface (HMI) 301 to allow a user to control various aspects of the system. The HMI may include both a manual input interface or a voice interface. The VCS 303 and HMI 301 may interact with one another. The VCS 303 may include a wireless or wired transceiver, such as a USB port or Bluetooth transceiver, to interact with a mobile device or audio gateway device 305.

The mobile device may request or indicate to the VCS that it needs to utilize the VCS or HMI. For example, the mobile device may receive a text message and send an SMS notification 307 to the vehicle computer system via Bluetooth. Other requests may include a phone call notification, request to update a phone book (e.g. via PBAP), request to stream audio files, send audio content, etc. The vehicle computer system may notify the HMI layer to call the API which relates to the notification 309, such as the HMI_SMS_Notify interface. The commands utilized to communicate between the HMI 301 and the VCS 303 may be a fixed message set in certain embodiments. The API will allow the HMI to interact with the mobile device to display certain information. Each profile may have a specific function to call based on the scenario of the mobile phone. For example, a phone call may utilize a certain function, a text message may utilize another function, audio streaming may utilize another, etc. Each function may utilize a predefined message set to interact with the device.

The HMI will update 311 to present the information to the user via the interface. The interface may be the display or a voice interface. In addition, the HMI or VCS may send a message to the mobile device via Bluetooth. The message may contain instructions or commands for the mobile device to perform a function, such as dial a number. The command from the HMI-side may be translated to allow the mobile device to perform the operation. For example, the "API Dial_Number" command 313 of the HMI may be converted to the "ATD Number" command for the mobile phone 315.

Upon receiving different messages or requests from the HMI, the mobile device may respond to those messages 317. For example, after dialing the phone, the mobile device may send a "Callback Call Status" request to the HMI 319. Again, the VCS may utilize an API or the Bluetooth stack to translate the message from the mobile device to the message from the interface.

In another embodiment, the VCS may include a pre-defined HMI that will communicate with the mobile device. The mobile device may download a new software stack from an off-board server upon connecting with the VCS. The VCS may download the new software stack and run a software update to install the new software stack. A new software stack may be installed on either the phone or the mobile device. The VCS HMI may interface with the new software stack to increase interoperability between the mobile device and the VCS.

Additionally, the VCS may confirm the message set that is used to facilitate interaction between the HMI, Bluetooth software stack, and the mobile phone. The mobile device may confirm the set of messages used to facilitate communication by sending pre-defined messages to the server/manufacturer. Thus, the mobile device may utilize the most recent software to facilitate communication. Additionally, the VCS may also be able to send the pre-defined message set, or another message to a server with an identification of the mobile device manufacturer or software. Upon the server determining the software stack to use for interaction, the VCS may download a software stack to update.

Additionally, the mobile device may request unique functionality to be implemented for the HMI of the VCS. The mobile device may request the VCS to download additional software functionality unique for the mobile device or manufacturer. For example, the mobile device manufacturer may request unique functionality of the VCS to differentiate the user-experience from other systems. Thus, the mobile device may request the VCS to download an additional software stack or message set to implement specifically for that specific mobile device.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle computer system (VCS) configured to communicate with a mobile device, comprising:
a wireless transceiver configured to communicate with a mobile device located in the vehicle;
a VCS software stack configured to interact with a mobile device Bluetooth profile;
a processor configured to:
receive a message from the mobile device located in the vehicle indicating a version of the mobile device Bluetooth profile;
determine memory space availability to download and install an update to the VCS software stack including an update to a vehicle Bluetooth profile;
determine if the VCS needs an update to the VCS software stack based at least upon the version of the mobile device Bluetooth profile;
download an update to the VCS software stack from an off-board server;
update the VCS to include the updated software stack including at least an update to the vehicle Bluetooth profile;
communicate with the mobile device utilizing at least the updated vehicle Bluetooth profile.

2. The vehicle computer system configured to communicate with a mobile device of claim 1, wherein the processor further is configured to download an update to the VCS software stack from an off-board server utilizing the mobile device.

3. The vehicle computer system configured to communicate with a mobile device of claim 1, wherein the processor is further configured to download an update to the VCS software stack from an off-board server utilizing a long-range wireless transceiver in communication with the VCS.

4. The vehicle computer system configured to communicate with a mobile device of claim 1, wherein the processor is further configured to download an update to the VCS software stack from an off-board server utilizing the wireless transceiver in communication with the mobile device.

5. The vehicle computer system configured to communicate with a mobile device of claim 1, wherein the message from the wireless transceiver also includes information regarding a manufacturer of the mobile device or information regarding an operating system of the mobile device.

6. The vehicle computer system configured to communicate with a mobile device of claim 1, wherein the VCS software stack facilitates communication between a Bluetooth profile and a human machine interface layer.

7. The vehicle computer system configured to communicate with a mobile device of claim 1, wherein the VCS software stack is located in a HCI layer.

8. A vehicle computer system (VCS) configured to communicate with one or more mobile devices, comprising:
a wireless transceiver configured to communicate with a mobile device located in the vehicle;
a VCS Bluetooth profile configured to interact with a mobile device Bluetooth profile;
a processor configured to:
receive a message from the mobile device located in the vehicle indicating a version of the Bluetooth profile;
determine if the VCS needs an update to the VCS Bluetooth profile based at least upon the version of the mobile device Bluetooth profile;
determine if sufficient memory space is available to download and install the update to the VCS Bluetooth profile;
download a software update to the VCS Bluetooth profile from an off-board server, the software update including additional features specific to the mobile device located in the vehicle;
update the VCS to include the software update;

communicate with the mobile device utilizing the updated VCS Bluetooth profile.

9. The vehicle computer system configured to communicate with a mobile device of claim 8, wherein the processor is further configured to output a notification to insert an external memory device when sufficient memory space is not available to download and install the update to the VCS Bluetooth profile.

10. The vehicle computer system configured to communicate with a mobile device of claim 8, wherein the message from the wireless transceiver includes information regarding a manufacturer of the mobile device or an operating system of the mobile device.

11. A method of a vehicle computer system communicating with a mobile device (MD) in a vehicle, comprising:
   receiving a MD Bluetooth profile version from-the MD;
   determining memory space availability for an update of a vehicle Bluetooth profile;
   downloading and installing the update of the vehicle Bluetooth profile from an off-board server based upon the MD Bluetooth profile version and memory space availability;
   communicating with the MD utilizing the updated vehicle Bluetooth profile.

12. The method of a vehicle computer system communicating with a mobile device (MD) in a vehicle of claim 11, wherein the vehicle Bluetooth profile is located in a HCI layer.

13. The method of a vehicle computer system communicating with a mobile device (MD) in a vehicle of claim 11, wherein the vehicle Bluetooth profile facilitates communication between a Bluetooth profile and a human machine interface layer.

14. The method of a vehicle computer system communicating with a mobile device (MD) in a vehicle of claim 11 further comprises receiving a message indicating information regarding a manufacturer of the MD or an operating system of the MD.

15. The method of a vehicle computer system) communicating with a mobile device (MD) in a vehicle of claim 11 further comprises outputting a notification to insert an external memory device when sufficient memory space is not available to download and install the update of the vehicle Bluetooth profile.

16. The method of a vehicle computer system communicating with a mobile device (MD) in a vehicle of claim 11 further comprises outputting a notification to that a network connection error is present when no connection is available to download the update.

\* \* \* \* \*